Patented Apr. 21, 1936 2,037,878

UNITED STATES PATENT OFFICE 2,037,878

PROCESS FOR MAKING MERCAPTO THIAZOLE COMPOUNDS

Adrien Cambron, Ottawa, Ontario, Canada, assignor, by mesne assignments, to E. I. du Pont de Nemours and Company, a corporation of Delaware No Drawing. Application July 7, 1930, Serial No. 466,370

11 Claims.  (Cl. 260—44)

This invention relates to reactions involving formamide or substituted formamides, such as formanilide, and more particularly to reactions of these compounds with sulphur and amines.

The object of this invention is the production of mercapto-aryl-thiazoles or their ammonium salts by the reaction of formamide, sulphur and a substituted or unsubstituted primary aryl amine having a replaceable hydrogen atom on the beta carbon atom. Many of the products thus produced are suited for use as accelerators for the vulcanization of rubber and other uses which form no part of this invention.

I have discovered that if formamide be heated with sulphur and a primary aryl amine having a replaceable beta hydrogen atom, an ammonium salt of the corresponding mercapto aryl thiazole will be formed, from which the free mercapto aryl thiazole can be obtained by simple treatment with an acid. I have further discovered that if the single equivalent of formamide and the aryl amine, to wit, the corresponding aryl substituted formamide be heated with sulphur the free mercapto aryl thiazole is directly formed. Thus the ammonium mercapto benzo thiazole is formed by reacting formamide, sulphur and aniline and the free thiazole liberated by HCl; or, the free mercapto benzo thiazole can be formed by reacting formanilide with sulphur; aniline may also be present in this last case in which event the aniline salt of the thiazole would be formed.

The characteristic mercapto thiazole grouping is:

I. 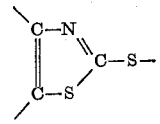

The aryl amines utilized in my reactions are shown by the general formula:

II. 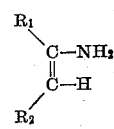

This grouping appears to go through the process unchanged except for the replacement of the beta hydrogen by a bond to a sulphur atom and the replacement of the two amino hydrogen atoms by a double bond to a carbon atom. $R_1$ and $R_2$, in this amine Formula II together represent the remainder of the substituted or unsubstituted benzene, naphthalene, anthracene or other aryl nucleus.

The general reaction is then illustrated by the following:

III. 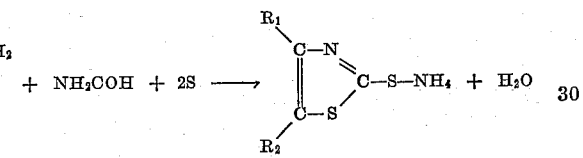

Specifically the reaction with aniline is illustrated by the following:

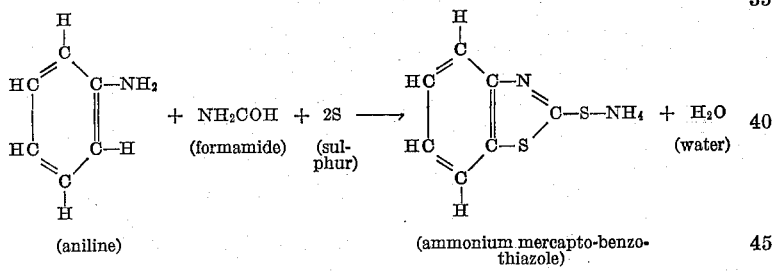

I have found that aniline and its nuclear substituted derivatives or homologues, such as those having an aryl or alkyl group substituted for hydrogen in the benzene nucleus, give particularly good results when used in my process, providing they have a replaceable hydrogen atom attached to the beta carbon atom.

I have prepared among others corresponding products from o-, m- and p- toluidine, o-chloraniline, alpha- and beta- naphthylamines, benzidine, p-amino-diphenyl, various xylidines, o-anisidine, and I find that the reaction is general and characteristic for these primary aryl amines all of which are characterized by the presence of a replaceable hydrogen atom attached to the beta carbon atom.

In general my process comprises bringing the reactants together and heating to the temperature of the reaction. The temperature necessary for reaction of any particular combination can easily be determined by preliminary trials with small amounts of materials. The yields are improved if the reaction is carried out under pressure instead of being brought about at ordinary atmospheric pressure. The desired reaction may take place under the total pressure generated by the confined reaction mixture or while gradually releasing the pressure to keep it below a predetermined amount, or additional pressure may be applied from an external source. My process is carried out in one step and gives high yields of high purity product. The raw materials are relatively inexpensive and are neither volatile nor inflammable. Neither raw materials nor products of the reaction are a source of troublesome manufacturing hazards. No highly poisonous by-product gases need to be disposed of.

The following examples will serve to illustrate my invention:

*Example I*

The materials used were as follows:

| | Grams |
|---|---|
| Aniline | 30 (corres. to 1. mol.) |
| Formamide | 23.3 (corres. to 1.6 mols) |
| Sulphur | 27.6 (corres. to 2.66 mols) |

These materials were confined in a steel bomb which was heated for 6 hours at a temperature of 190° C., and under the pressure developed by vaporization of the reactants and reaction products. At the end of this time, the ammonium mercapto benzo thiazole was dissolved by a dilute aqueous solution of ammonia and filtered from the reaction mixture. The small amount of unchanged aniline went through the filter with the solution of ammonium mercapto benzo thiazole. The filtrate was made acid by the addition of a slight excess of 10% aqueous HCl thus causing the aniline to dissolve as the hydrochloride and precipitating the free mercapto benzo thiazole which was then filtered off and dried. The filtrate from the free mercapto benzo thiazole was made alkaline and the unchanged aniline extracted therefrom by ether. After evaporation of the ether, the aniline was weighed. The crude precipitated product was dried and showed a yield of 85.8% of mercapto benzo thiazole based on the unrecovered aniline. The raw product thus obtained was about 96% pure and melted at 158 to 159° C.

*Example II*

8 grams of formanilide were heated with 4.3 grams of sulfur for three hours at 240° C. in a glass bomb, and under the pressure developed by vaporization of the reactants and reaction products. At the end of 3 hours, the mercapto benzo thiazole was dissolved by a dilute aqueous solution of ammonia, filtered from the insoluble constituents of the reaction mixture and then precipitated, separated and dried in same way as in Example I. The crude dry mercapto benzo thiazole, having a melting point of 159 to 160° C., was obtained with a yield of 46.3% based on the formanilide used and was of comparable purity to that obtained in Example I.

The reaction or reactions occurring in this example may be illustrated in accord with the general symbols previously used:

IV. 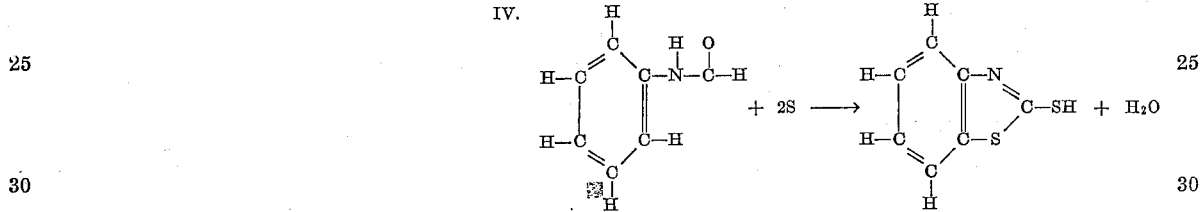

*Example III*

| | Grams | Molecular proportions |
|---|---|---|
| p-toluidine | 34.5 | 1 |
| Formamide | 23.3 | 1.66 |
| Sulfur | 27.6 | 2.66 |

This charge was sealed in a steel bomb and heated under the pressure developed by vaporization of the reactants and the reaction products for 4 hours at about 195° C. The reaction material was then removed from the bomb and leached with 30 grams of sulfuric acid in 300 cc. of hot water, broken into a powder, filtered and washed. The crude product was then purified by dissolving it in dilute ammonia and filtering. The ammoniacal solution was then acidified with sulfuric acid and the precipitated 5-methyl mercapto-benzothiazole filtered off and dried. The dried product melted at 171–175° C. and was obtained in 85% yield based upon the p-toluidine unrecovered.

*Example IV*

This example was carried out under the same conditions as in Example III and using the same weights of formamide and sulfur, but reacting these with 34.5 grams of ortho-toluidine instead of p-toluidine. The crude 3-methyl mercapto benzothiazole obtained melted at 182 to 184° C., yield about 45%.

*Example V*

The following charge was placed in a steel bomb:

| | Grams | Molecular proportions |
|---|---|---|
| β-naphthyl amine | 46.1 | 1.00 |
| Formamide | 23.3 | 1.60 |
| Sulfur | 27.6 | 2.66 |

This charge was heated in the bomb for 4 hours at 195° C. The reaction mixture was then washed with hot dilute sulfuric acid and unreacted naphthylamine was filtered off. The residue on the filter was then treated with dilute sodium hydroxide solution, filtered, and the filtrate acidified with dilute mineral acid to precipitate the crude mercapto-β-naphtho thiazole which was separated by filtration and then dried. The dry product showed a melting point of 205 to 212° C. and a yield of about 74% based on the amine unrecovered. After one crystallization from alcohol diluted with water, the product melted at 207–211° C.

At the temperature at which the reactions of my invention occur, some free hydrogen sulfide, as well as some ammonia, may be produced, causing a pressure in excess of the vapor pressure of the reacting materials to be built up in the reaction vessel, if this is closed. In such cases, the pressure may become dangerous. However, I have found that the presence of nitro benzene in the reaction mixture reduces these pressures considerably, thus making the reaction safer.

*Example VI*

The materials used were:

| | Pounds |
|---|---|
| Aniline | 64.0 |
| Nitrobenzene | 12.8 |
| Formamide | 56.3 |
| Sulfur | 61.5 |

These materials were put in a steel autoclave and heated at 200° C. for 2½ hours. The pressure developed by the above reactants at 200° C. was about 1150 lbs. per square inch. At the end of 2½ hours the charge was allowed to cool down to 150°–170° C. and then transferred to a tank equipped with a stirrer and containing 200 lbs. of water. The contents of the tank were kept hot and well stirred until the product was in finely divided form. 56 lbs. of concentrated sulfuric acid, diluted to a 50% solution were added with agitation and the contents of the tank stirred about 15 minutes, filtered hot, and the precipitate washed with 200 lbs. of hot water to free the material as completely as possible from any unchanged aniline and $H_2S$. The crude mercaptobenzothiazole was dried at 80 to 90° C. and then showed a yield of about 75 to 80% of theory based on the unrecovered aniline.

I have carried out my invention in sealed bombs made of glass, or of metal, such as iron or steel alone, or chrominum plated or aluminum lined. The materials can be reacted in an open space or under a reflux, but the rate of reaction is less.

The temperatures used in this process will vary with the reactants. However, I prefer temperatures of about 170° to 270° C. Below 170° C. the yields are low, while above 270° C. the yields begin to fall off, probably due to side reactions or decompositions.

Although the above equations indicate the use of 2 moles of sulfur for each mole of primary aryl amine or the corresponding substituted formamide derived therefrom, I generally prefer to use an excess over this amount of sulfur. This excess appears to favor the reaction and any unused sulfur is easily separated by filtration from the alkaline aqueous solution of mercapto thiazole.

Although I have given specific examples of how to practice my invention, and have illustrated what I believe to be the course of the chemical reactions concerned, I do not wish in any way to be limited to quantities, etc. of these specific examples, the supposed reactions, etc.

I claim:

1. Process of preparing the ammonium salt of a mercapto aryl thiazole which comprises reacting formamide, sulphur and a primary aryl carbocyclic amine having a replaceable hydrogen on the beta carbon atom in the presence of nitro benzene.

2. Process of preparing the ammonium salt of mercapto-benzo-thiazole which comprises reacting formamide, sulphur and aniline in the presence of nitro benzene.

3. Process of preparing the ammonium salt of 3-methyl mercapto-benzo-thiazole which comprises reacting formamide, sulphur and ortho toluidine in the presence of nitro benzene.

4. Process of preparing the ammonium salt of a mercapto aryl thiazole which comprises reacting formamide, sulphur and a primary aryl carbocyclic amine having a replaceable hydrogen on the beta carbon atom under pressure at a temperature of 170-270° C. in the presence of nitro benzene.

5. Process of preparing the ammonium salt of a mercapto-aryl-thiazole which comprises reacting under pressure and at a temperature between 170° C. and 270° C. one mole of a primary aryl carbocyclic amine having a replaceable hydrogen on a beta carbon atom, with between 1 to 2 moles of formamide and 2 to 3 moles of sulphur in the presence of nitro benzene.

6. Process of preparing the ammonium salt of a mercapto-benzo-thiazole which comprises reacting under pressure and at a temperature between about 170° C. and about 270° C., one mole of a primary aryl carbocyclic amine of the benzene series having a replaceable hydrogen on a beta carbon atom, with between 1 to 2 moles of formamide and 2 to 3 moles of sulfur in the presence of nitro benzene.

7. Process of preparing the ammonium salt of a mercapto-benzo-thiazole which comprises reacting under pressure and at a temperature between about 170° C. and about 270° C., one mole of a toluidine with between 1 to 2 moles of formamide and 2 to 3 moles of sulfur in the presence of nitro benzene.

8. Process of preparing the ammonium salt of a mercapto-benzo-thiazole which comprises reacting under pressure and at a temperature between about 170° C. and about 270° C., one mole of ortho toluidine with between 1 to 2 moles of formamide and 2 to 3 moles of sulfur in the presence of nitro benzene.

9. Process of preparing the ammonium salt of a mercapto-benzo-thiazole which comprises reacting under pressure and at a temperature between about 170° C. and about 270° C., one mole of aniline with between 1 to 2 moles of formamide and 2 to 3 moles of sulfur in the presence of nitro benzene.

10. Process of preparing the ammonium salt of a mercapto-naphtho-thiazole which comprises reacting under pressure and at a temperature between about 170° C. and about 270° C., one mole of a naphthylamine having a replaceable hydrogen on a beta carbon atom, with between 1 to 2 moles of formamide and 2 to 3 moles of sulfur in the presence of nitro benzene.

11. Process of preparing the ammonium salt of a mercapto-naphtho-thiazole which comprises reacting under pressure and at a temperature between about 170° C. and about 270° C., one mole of β-naphthyl amine with between 1 to 2 moles of formamide and 2 to 3 moles of sulfur in the presence of nitro benzene.

ADRIEN CAMBRON.